(12) United States Patent
Ramesh et al.

(10) Patent No.: US 8,335,772 B1
(45) Date of Patent: Dec. 18, 2012

(54) OPTIMIZING DML STATEMENT EXECUTION FOR A TEMPORAL DATABASE

(75) Inventors: Bhashyam Ramesh, Secunderabad (IN); Manjula Koppuravuri, Secunderabad (IN)

(73) Assignee: Teradata US, Inc., Dayton, OH (US)

( * ) Notice: Subject to any disclaimer, the term of this patent is extended or adjusted under 35 U.S.C. 154(b) by 608 days.

(21) Appl. No.: 12/269,331

(22) Filed: Nov. 12, 2008

(51) Int. Cl.
*G06F 17/30* (2006.01)
(52) U.S. Cl. ......... 707/694; 707/746; 707/802; 707/702
(58) Field of Classification Search .................. None
See application file for complete search history.

(56) References Cited

U.S. PATENT DOCUMENTS

| | | | |
|---|---|---|---|
| 2003/0014393 A1* | 1/2003 | Kabra et al. | 707/3 |
| 2003/0055807 A1* | 3/2003 | Lomet | 707/1 |
| 2004/0139116 A1* | 7/2004 | Porter | 707/104.1 |
| 2004/0236724 A1* | 11/2004 | Chien et al. | 707/3 |
| 2006/0085456 A1* | 4/2006 | Pickering | 707/100 |
| 2008/0189311 A1* | 8/2008 | Cote et al. | 707/101 |

OTHER PUBLICATIONS

Brune, Robert. "BiTemporal Design: Time After Time." SQL Server Magazine. Sep. 20, 2005. http://www.windowsitpro.com/article/data-modeling/bitemporal-design-time-after-time.aspx.*
Patel, Jaymin. "Temporal Database System." Department of Computing, Imperial College, University of London. Jun. 18, 2003. http://www.doc.ic.ac.uk/~pjm/teaching/student_projects/jaymin_patel.pdf.*
Capelli, Alessandro et al. "A Modular History-Oriented Access Structure for Bitemporal Relational Databases." LNCS, 1995. http://www.springerlink.com/content/pk6113641p360354/.*
Fuller,"Understanding SQL Server's With RECOMPILE Option." Apr. 11, 2005. <http://www.techrepublic.com/article/understanding-sql-servers-with-recompile-option/5662581>.*

* cited by examiner

*Primary Examiner* — Syed Hasan
(74) *Attorney, Agent, or Firm* — Howard Speight

(57) ABSTRACT

A method, system, and computer program for optimizing execution of a DML statement on a temporal database are disclosed. A first execution package is provided to an execution engine. The first execution package includes a plurality of operations to be executed if the contents of a row in a table in the temporal database indicate the row has a first temporal condition. A second execution package is provided to the execution engine. The second execution package includes a plurality of operations to be executed if the contents of the row in the table in the temporal database indicate the row has a second temporal condition. The execution engine is run to produce a result. The result is saved.

18 Claims, 3 Drawing Sheets

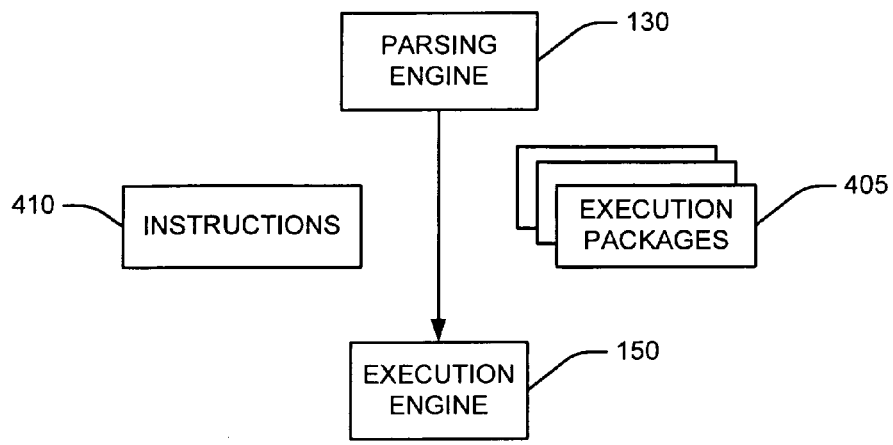
FIG. 4
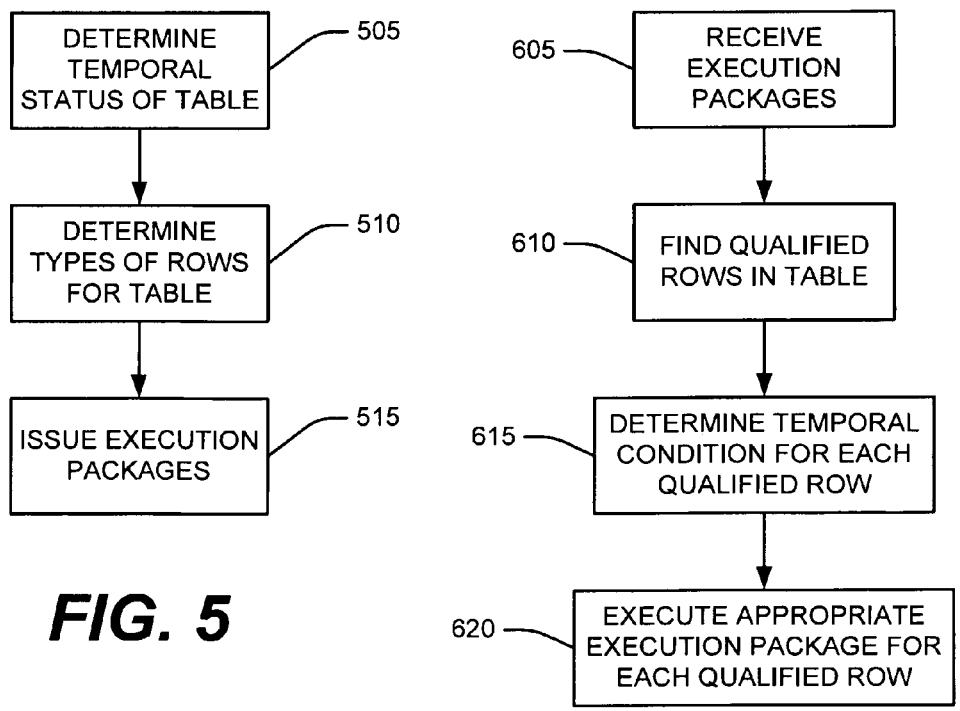
FIG. 5
FIG. 6

OPTIMIZING DML STATEMENT EXECUTION FOR A TEMPORAL DATABASE

BACKGROUND

In a conventional database without temporal support, data stored in tables is considered to be valid at the current time. Such a database does not inherently retain data that were present at some point in the past or data that will become valid in the future. In a temporal database it is possible to attach temporal dimensions to data and keep past, present, and future information.

SUMMARY

In general, in one aspect, the invention features a method for optimizing execution of a DML statement on a temporal database. The method further includes providing a first execution package to an execution engine. The first execution package includes a plurality of operations to be executed if the contents of a row in a table in the temporal database indicate the row has a first temporal condition. The method further includes providing a second execution package to the execution engine. The second execution package includes a plurality of operations to be executed if the contents of the row in the table in the temporal database indicate the row has a second temporal condition. The method further includes running the execution engine to produce a result. The method further includes saving the result.

Implementations of the invention include one or more of the following. The method may include creating the first execution package. The first execution package may include an order that the plurality of operations in the first execution package are to be executed by the execution engine. The method may include creating the second execution package. The second execution package may include an order that the plurality of operations in the second execution package are to be executed by the execution engine. Running the execution engine may include determining that the contents of the row in the table in the temporal database indicate the row has a first temporal condition and, in response, executing the first set of operations for the row. Running the execution engine may include determining that the contents of the row in the table in the temporal database indicate the row has a first temporal condition and, in response, executing the operations included in the first execution package for the row in an order specified for the first execution package. The method may further include determining the possible temporal conditions for rows in the table. The method may further include providing an execution package, including the first execution package and the second execution package, for each possible temporal condition. The method may further include providing instructions as to choosing between the first execution package and the second execution package when executing the execution engine for a particular row in the table.

In general, in another aspect, the invention features a database system including one or more nodes and a plurality of CPUs, each of the one or more nodes providing access to one or more CPUs. The system further includes a plurality of virtual processes, each of the one or more CPUs providing access to one or more virtual processes. Each virtual process is configured to manage data, including rows from the set of database table rows, stored in one of a plurality of data-storage facilities. The system further includes a process configured to optimize execution of a DML statement on a temporal database by providing a first execution package to an execution engine. The first execution package includes a plurality of operations to be executed if the contents of a row in a table in the temporal database indicate the row has a first temporal condition. The process further includes providing a second execution package to the execution engine. The second execution package includes a plurality of operations to be executed if the contents of the row in the table in the temporal database indicate the row has a second temporal condition. The process further includes running the execution engine to produce a result. The process further includes saving the result.

In general, in another aspect, the invention features a computer program, stored in a computer-readable tangible medium. The program includes executable instructions that cause a computer to provide a first execution package to an execution engine. The first execution package includes a plurality of operations to be executed if the contents of a row in a table in the temporal database indicate the row has a first temporal condition. The program further includes executable instructions that cause a computer to provide a second execution package to the execution engine. The second execution package includes a plurality of operations to be executed if the contents of the row in the table in the temporal database indicate the row has a second temporal condition. The program further includes executable instructions that cause a computer to run the execution engine to produce a result. The program further includes executable instructions that cause a computer to save the result.

BRIEF DESCRIPTION OF THE DRAWINGS

FIG. 4 illustrates a parsing engine providing a plurality of execution packages to an execution engine.

FIG. 5 is a flow chart for the parsing engine to produce the execution packages.

FIG. 6 is a flow chart for the execution engine to execute the execution packages.

DETAILED DESCRIPTION

Figure 1:
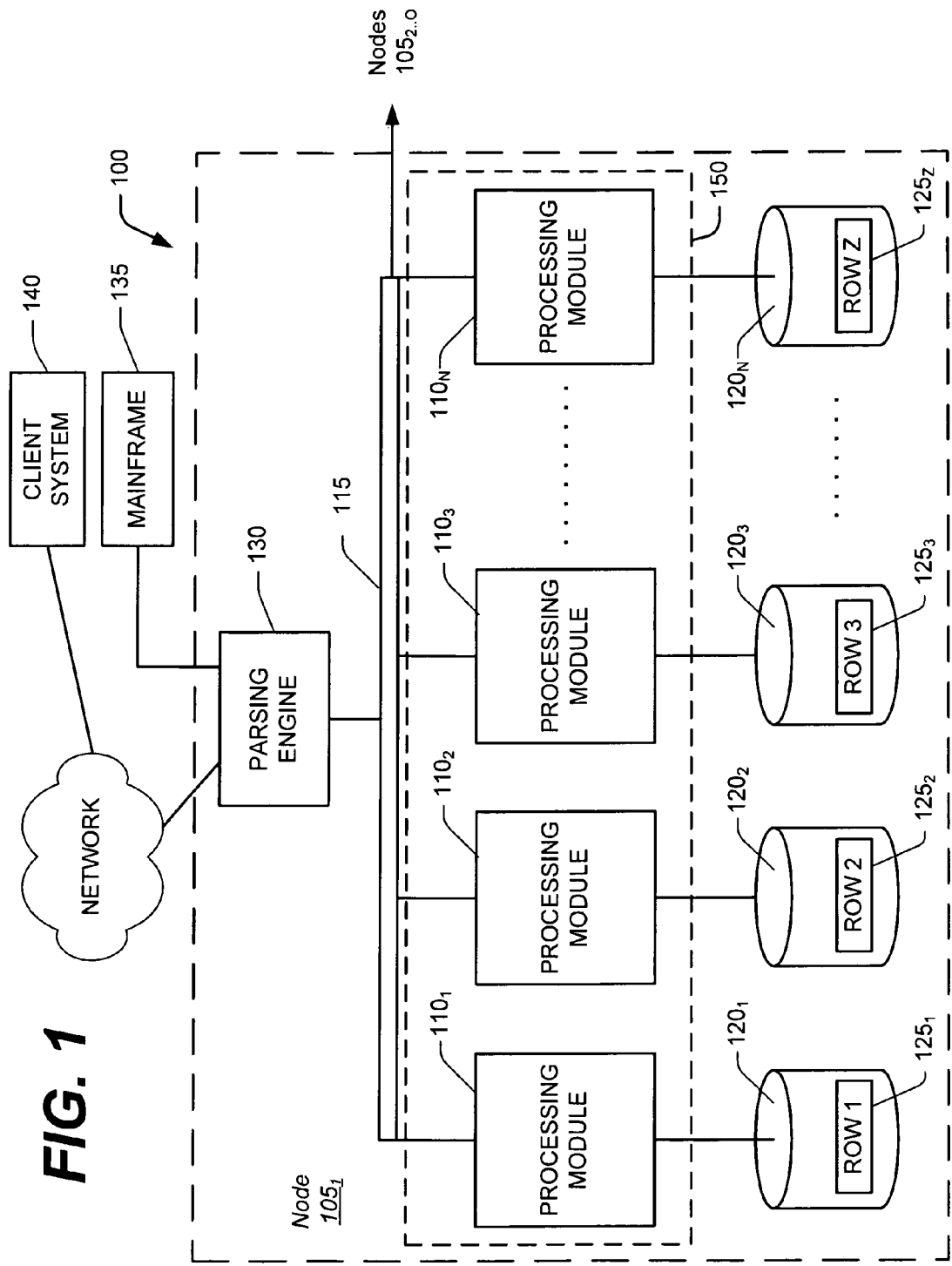
FIG. 1 is a block diagram of a node of a parallel processing database system.

The optimization technique disclosed herein has particular application, but is not limited, to large databases that might contain many millions or billions of records managed by a database management system ("DBMS") 100, such as a Teradata Active Data Warehousing System available from the assignee hereof. FIG. 1 shows a sample architecture for one node $105_1$ of the DBS 100. The DBS node $105_1$ includes one or more processing modules $110_{1...N}$, connected by a network 115, that manage the storage and retrieval of data in data-storage facilities $120_{1...N}$. Each of the processing modules $110_{1...N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1...N}$ manages a portion of a database that is stored in a corresponding one of the data-storage facilities $120_{1...N}$. Each of the data-storage facilities $120_{1...N}$ includes one or more disk drives. The DBS may include multiple nodes $105_{2...N}$ in addition to the illustrated node $105_1$, connected by extending the network 115.

The system stores data in one or more tables in the data-storage facilities $120_{1...N}$. The rows $125_{1...Z}$ of the tables are stored across multiple data-storage facilities $120_{1...N}$ to ensure that the system workload is distributed evenly across the processing modules $110_{1...N}$. A parsing engine 130 organizes the storage of data and the distribution of table rows $125_{1...Z}$ among the processing modules $110_{1...N}$. The parsing engine 130 also coordinates the retrieval of data from the data-storage facilities $120_{1...N}$ in response to queries received from a user at a mainframe 135 or a client computer 140. The DBMS 100 usually receives queries and commands to build tables in a standard format, such as SQL.

In one implementation, the rows $125_{1...Z}$ are distributed across the data-storage facilities $120_{1...N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_{1...N}$ and associated processing modules $110_{1...N}$ by a hash bucket map. The characteristics of the columns chosen for the primary index determine how evenly the rows are distributed.

Figure 2:
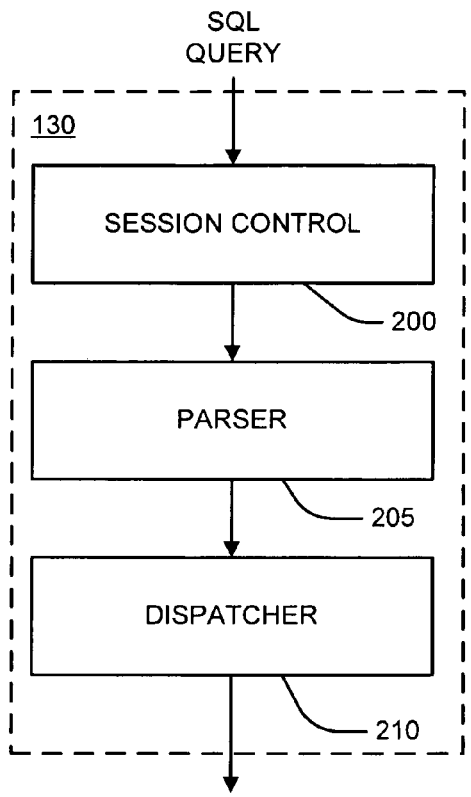
FIG. 2 is a block diagram of a parsing engine.

In an example system, the parsing engine 130 is made up of three components: a session control 200, a parser 205, and a dispatcher 210, as shown in FIG. 2. Session control 200 provides a logon and logoff function. It accepts a request for authorization to access the database, verifies it, and then either allows or disallows the access.

Figure 3:
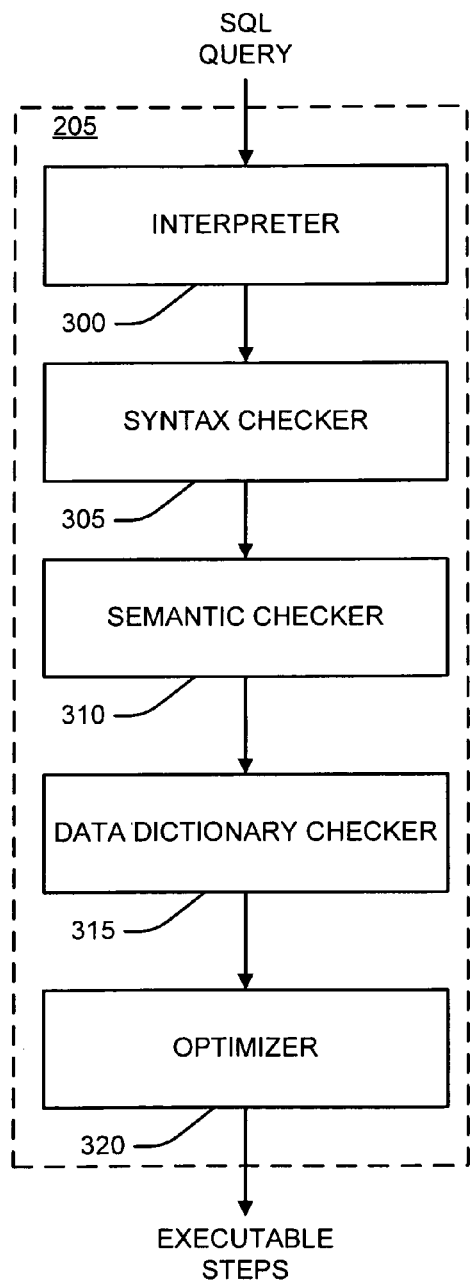
FIG. 3 is a block diagram of a parser.

Once session control 200 allows a session to begin, a user may submit a structured query language ("SQL") request, which is routed to parser 205. As illustrated in FIG. 3, parser 205 interprets the SQL request (block 300), checks it for proper SQL syntax (block 305), evaluates it semantically (block 310), and consults a data dictionary to ensure that all of the objects specified in the SQL request actually exist and that the user has the authority to perform the request (block 315). Finally, the parser 205 runs an optimizer (block 320), which develops, for example, the least expensive plan to perform the request. The optimizer 320 provides the developed plan to the dispatcher 210 which, in turn, dispatches execution operations required to perform the developed plan to the execution engine 150, i.e., processing modules $110_{1...N}$. In one embodiment, the execution engine 150 includes the network 115. In one embodiment, the execution engine includes the data storage facilities $120_{1...N}$. In one embodiment, the execution engine extends across multiple nodes $105_{1...O}$.

A temporal database management system is defined to be a database management system with built-in support for reasoning with time such as a temporal data model and a temporal version of SQL.

A temporal database is defined to be a database capable of inherently storing data (i.e., without the use of user-defined date or timestamp columns, or the like) that relates to time instances. Such a database provides temporal data types and stores information related to the past, present, and future. For example, it stores an inventory history or the movement of employees within an organization. While a conventional database can maintain temporal data, it is typically done using user-defined date or timestamp columns, or the like, which are maintained in a temporal manner.

In one embodiment, there are three different fundamental kinds of time in a temporal database. The first type is user-defined times that are un-interpreted time values. Such times typically are defined as DateTime data types or Period data types.

In one embodiment, DateTime data types are conventional types. In one embodiment, Period data types define a time period and include a beginning element that defines the beginning of the time period and an ending element that defines the end of the time period.

In one embodiment, the second fundamental kind of time in a temporal database is ValidTime, which is typically defined as a Period data type with an element type of DATE or TIMESTAMP, and which is defined to denote the time period during which a fact (typically represented as a row in a table) is true (or valid) with respect to the real world.

In one embodiment, the third fundamental kind of time in a temporal database is TransactionTime, which is typically defined as a Period data type with an element type of TIMESTAMP, and which is defined to denote the time period beginning when a fact was first known (or recorded in) the database and ending when superseded by an update to the fact or when the fact is deleted.

In one embodiment, the ValidTime and TransactionTime period values do not have to be the same for a row. In one embodiment, the three kinds of time are orthogonal. That is, a table can have one, two, or all three kinds of time, each providing a different dimension for reasoning on time.

A ValidTime table is defined to be a table that has ValidTime but not TransactionTime.

A TransactionTime table is defined to be a table that has TransactionTime but not ValidTime.

A bi-temporal table is defined to be a table that has both ValidTime and TransactionTime.

A temporal table is defined to be a table that has ValidTime and/or TransactionTime.

A non-temporal table is defined to be a table that has neither ValidTime nor TransactionTime.

In one embodiment, as is conventional, there are three forms or variants of temporal statements: current, sequenced, and non-sequenced. A temporal statement of the current form is defined to be a statement that works with the current snapshot of data. A temporal statement of the sequenced form is defined to be a statement that considers the table as a sequence of snapshot states and works with each state of the data independently. A sequenced form can optionally specify the period of interest for the sequenced operation. This period of interest is called the period of applicability. A temporal statement of the non-sequenced type ignores the time dimensions for data and works across all the snapshot states simultaneously.

In one embodiment, a row in a ValidTime table can be a current row, a future row, or a history row. A current row is defined to be a row in which its ValidTime period overlaps current time. A future row is defined to be a row in which the begin time of its ValidTime period is in the future with respect to current time. A history row is defined to be a row in which the end time of its ValidTime is in the past with respect to current time. A valid row is defined to be a current row or a future row. A no-longer-valid row is defined to be a history row. A special case of ValidTime period being NULL is defined in which a row does not qualify as a current row, future row, or history row.

A row in a table with TransactionTime (i.e., a Transaction-Time table or a bi-temporal table) can be an open row or a closed row. An open row is defined to be a row in which the TransactionTime end time is UNTIL_CLOSED. A closed row is a row in which the TransactionTime end time is not UNTIL_CLOSED (i.e., the row is closed in Transaction-Time).

In one embodiment, the UNTIL_CLOSED literal has a value associated with a time far in the future, such as the year 9999.

In a TransactionTime table, an open row is also called a current row and a closed row is also called a history row. In one embodiment, there is not concept of a future row in the TransactionTime dimension because the system maintains the TransactionTime column such that a TransactionTime begin time is never in the future and a TransactionTime end time is either UNTIL_CLOSED or in the past.

In one embodiment, a row in a bi-temporal table can be a current row, a future row, or a history row. A current row is defined to be an open row in which the ValidTime period overlaps current time. A future row is an open row in which the ValidTime begin time is in the future with respect to current time. A valid row is a row in which the ValidTime period overlaps current time or in which the ValidTime begin time is in the future with respect to current time. All rows that are either not open in TransactionTime or not valid in Valid-Time are called history rows. An open but no-longer-valid row, a valid but closed row, and a neither valid nor open row are all history rows. In one embodiment, a row is not considered a current, future, or history row if the ValidTime period is null.

In one embodiment, all rows in a ValidTime table are considered to be open rows in the TransactionTime dimension and, therefore, the definition of a current, future, or history row is the same as for a bi-temporal table. Further, in one embodiment all rows in a TransactionTime table are considered to overlap current time in the ValidTime dimension and, therefore, the definition of a current or history row is the same as for a bi-temporal table. In addition, the definition of a valid or no-longer-valid row is the same for all three kinds of temporal tables.

A DML statement is defined to be a statement such as INSERT or UPDATE statements that adds, modifies, or deletes table rows, and does not include the SQL SELECT statement.

A current query (i.e., a SQL SELECT statement) or a current DML statement operates on the current rows of a table. A current constraint operates on current and future rows of a table.

A single modification DML statement, such as an UPDATE, INSERT, or DELETE, issued on a temporal table may map to more than one SQL operation on the table. For example, an update on a bi-temporal table may lead to one update and multiple inserts. The actual number of operations depends on the temporal content of the row. Therefore this mapping is one-to-many. The mapping is not constant. It depends on the validity of the row and the number of time dimensions—ValidTime, TransactionTime or both.

For example, a user issued CURRENT VALIDTIME DELETE on a ValidTime table maps to an update on current rows. The ValidTime portion starting from current time is deleted. If the ValidTime starts at current time then the row is deleted. A user issued SEQUENCED VALIDTIME DELETE on a ValidTime table without a period of applicability deletes the row. With a period of applicability this operation deletes the period of applicability portion from the ValidTime of the row and therefore can result in some combination of an update, delete and insert. Consider the ValidTime table named Employee_Salary shown in Table 1 (note that the dates are shown in mm-dd-yyyy format and, for simplicity of presentation, do not include time information; it will be understood that other formats are possible and that more precise time information can be included):

TABLE 1

| Employee_ID | Salary | Job_Duration (ValidTime) |
|---|---|---|
| 1001 | 50000 | Jan. 01, 2007, Jan. 01, 2008 |
| 1001 | 55000 | Jan. 01, 2008, Jan. 01, 2009 |
| 1001 | 57000 | Jan. 01, 2009, UNTIL_CHANGED |

Assuming that the current date is sometime during 2008, Table 1 indicates that employee 1001's salary was $50,000 during 2007, is $55,000 during 2008, and is scheduled to increase to $57,000 during 2009. The first row is a history row, the second row is a current row, and the third row is a future row. Assume the following DML statement is executed on Jul. 1, 2008:

SEQUENCED VALIDTIME PERIOD(CURRENT_DATE, UNTIL_CHANGED) DELETE FROM Employee_Salary WHERE Employee_ID=1001;

To execute this statement in one embodiment, no change is required to the first row, the second row is updated to show the deletion date, and the third row is deleted producing the result in Table 2:

TABLE 2

| Employee_ID | Salary | Job_Duration (ValidTime) |
|---|---|---|
| 1001 | 50000 | Jan. 01, 2007, Jan. 01, 2008 |
| 1001 | 55000 | Jan. 01, 2008, Jul. 01, 2008 |

A user issued CURRENT VALIDTIME UPDATE on a ValidTime table maps to an update and insert on current rows. A user issued SEQUENCED VALIDTIME <period of applicability> UPDATE on a ValidTime table maps to an update, on the rows whose ValidTime overlaps with the specified PA, for the overlapped portion and inserts for the non-overlapping portions of the ValidTime value. Considering again the Valid-Time table in Table 1 above, assume the following DML statement is executed on Jul. 1, 2008. Assume that we wish to increase the salary from 2009 to $60,000.

SEQUENCED VALIDTIME
PERIOD (DATE '2009-01-01', UNTIL_CHANGED)
UPDATE Employee_Salary
SET Salary='60000'
WHERE Employee_ID='1001'
;

To execute this statement in one embodiment, no change is required to the first row, an update and an insert is required on the second row and an update is required on the third row, producing the result in Table 3:

TABLE 3

| Employee_ID | Salary | Job_Duration (ValidTime) |
|---|---|---|
| 1001 | 50000 | Jan. 01, 2007, Jan. 01, 2008 |
| 1001 | 55000 | Jan. 01, 2008, Jan. 01, 2009 |
| 1001 | 60000 | Jan. 01, 2009, UNTIL_CHANGED |

A user issued CURRENT VALIDTIME UPDATE on a bi-temporal table maps to an update and up to two inserts on current rows. A user issued SEQUENCED VALIDTIME <period of applicability> UPDATE on a bi-temporal table maps to an update, on open rows whose ValidTIme overlaps with the specified PA, to close the open row and inserts multiple rows for the overlapped and non-overlapping Valid-Time portions. Consider the bi-temporal table named Employee_Salary_Bi_Temporal shown in Table 4:

TABLE 4

| Employee_ID | Salary | Job_Duration (ValidTime) | TransactionTime |
|---|---|---|---|
| 1001 | 50000 | Jan. 01, 2007, UNTIL_CHANGED | Jan. 01, 2007, UNTIL_CLOSED |

Assume the following DML statement is executed on Sep. 15, 2007:
SEQUENCED VALIDTIME PERIOD(01-01-2008,UNTIL_CHANGED)
UPDATE Employee_Salary_Bi_Temporal
SET Salary='55000'
WHERE Employee_ID='1001';
To execute this statement in one embodiment, the single row is updated and two new rows are inserted:

TABLE 5

| Employee_ID | Salary | Job_Duration (ValidTime) | TransactionTime |
|---|---|---|---|
| 1001 | 50000 | Jan. 01, 2007, UNTIL_CHANGED | Jan. 01, 2007, Sep. 15, 2007 |
| 1001 | 50000 | Jan. 01, 2007, Jan. 01, 2008 | Sep. 15, 2007, UNTIL_CLOSED |
| 1001 | 55000 | Jan. 01, 2008, UNTIL_CHANGED | Sep. 15, 2007, UNTIL_CLOSED |

In Table 5, the first row is now a history row (i.e., because it is a closed row in the TransactionTime dimension), the second row is a current row until Jan. 1, 2008 when it becomes a history row, and the third row is a future row until Jan. 1, 2008 when it becomes a current row.

Now assume the following DML statement is executed on Oct. 1, 2008:
SEQUENCED VALIDTIME
PERIOD (Date '2009-01-01', UNTIL_CHANGED)
UPDATE Employee_Salary_Bi_Temporal
SET Salary='57000'
WHERE Employee_ID='1001';
On Oct. 1, 2008 at the time of execution of the DML statement, the first two rows of the Employee_Salary_Bi_Temporal table, whose current status is shown in Table 5, are history rows and the third row is the qualified row whose ValidTime overlaps with the specified period-of-applicability and is an open row. To execute this DML statement in one embodiment, the first two rows are not changed, the third row is updated and two new rows are inserted:

TABLE 6

| Employee_ID | Salary | Job_Duration (ValidTime) | TransactionTime |
|---|---|---|---|
| 1001 | 50000 | Jan. 01, 2007, UNTIL_CHANGED | Jan. 01, 2007, Sep. 15, 2007 |
| 1001 | 50000 | Jan. 01, 2007, Jan. 01, 2008 | Sep. 15, 2007, UNTIL_CLOSED |
| 1001 | 55000 | Jan. 01, 2008, UNTIL_CHANGED | Sep. 15, 2007, Oct. 01, 2008 |
| 1001 | 55000 | Jan. 01, 2008, Jan. 01, 2009 | Oct. 01, 2008, UNTIL_CLOSED |

TABLE 6-continued

| Employee_ID | Salary | Job_Duration (ValidTime) | TransactionTime |
|---|---|---|---|
| 1001 | 57000 | Jan. 01, 2009, UNTIL_CHANGED | Oct. 01, 2008, UNTIL_CLOSED |

In Table 6, the first three rows are history rows (the first and third rows because they are closed in the TransactionTime dimension, and the second row because the Job_Duration period does not overlap the current time), the fourth row is a current row until Jan. 1, 2009 when it becomes a history row, and the fifth row is a future row until Jan. 1, 2009 when it becomes a current row.

Now assume the following DML statement is executed on Oct. 10, 2008:
SEQUENCED VALIDTIME
PERIOD (Date '2009-01-01', UNTIL_CHANGED)
UPDATE Employee_Salary_Bi_Temporal
SET Salary='60000'
WHERE Employee_ID='1001';
To execute this DML statement in one embodiment, the first four rows are not changed, the fifth row is updated and a new row is inserted:

TABLE 7

| Employee_ID | Salary | Job_Duration (ValidTime) | TransactionTime |
|---|---|---|---|
| 1001 | 50000 | Jan. 01, 2007, UNTIL_CHANGED | Jan. 01, 2007, Sep. 15, 2007 |
| 1001 | 50000 | Jan. 01, 2007, Jan. 01, 2008 | Sep. 15, 2007, UNTIL_CLOSED |
| 1001 | 55000 | Jan. 01, 2008, UNTIL_CHANGED | Sep. 15, 2007, Oct. 01, 2008 |
| 1001 | 55000 | Jan. 01, 2008, Jan. 01, 2009 | Oct. 01, 2008, UNTIL_CLOSED |
| 1001 | 57000 | Jan. 01, 2009, UNTIL_CHANGED | Oct. 01, 2008, Oct. 10, 2008 |
| 1001 | 60000 | Jan. 01, 2009, UNTIL_CHANGED | Oct. 10, 2008, UNTIL_CLOSED |

As described above, the parsing engine 130 formulates and dispatches required execution operations as steps to the execution engine, i.e., processing modules $110_{1...N}$. In one embodiment, each step performs one well defined operation. The sequence of steps to be performed is ordered by the parsing engine 130. Further, in one embodiment, the execution operation specified in a step is data value independent.

In one embodiment, the temporal database system described herein formulates multiple operations, orders them in the order they are to be executed and dispatches the multiple operations as an execution package. The execution engine performs the operations in the order in which they are specified in the execution package.

For an update step on a bi-temporal table, for example, the execution package will contain a copy operation to copy the contents of a qualified row, an update operation to update the row and two sets of instructions to perform two inserts based on the copied row. These operations will be applied after a row is qualified for the normal user specified qualification conditions in the step. Thus, an execution package is defined to be a set of operations to be performed on a row having a particular temporal condition. A temporal condition of a row is defined to be the status of the row in the time dimensions of the table. For example, in one embodiment, a row in a Valid-Time table can have the following temporal conditions: history, current, or future. In one embodiment, a row in a TransactionTime table can have the following temporal conditions:

open or closed. In one embodiment, a row in a bi-temporal table can have the following temporal conditions: history, current, or future.

In addition, because the operations on a temporal table depend on the actual contents of a row, in one embodiment multiple execution packages are prepared and provided to the execution engine. The execution package to execute for a given row is selected depending on the contents of the time dimensions of the row.

For example, if an operation on a bit-temporal table is to be executed, the system will generate multiple execution packages to be used on open rows whose ValidTime overlaps the period of applicability with appropriate packages to copy, update, and perform multiple inserts.

In general, in one embodiment, as shown in FIG. 4, when executing a DML statement against a temporal table, the parsing engine 130 will issue a plurality of execution packages 405 to the execution engine for processing against the temporal table. In one embodiment, the parsing engine 130 will issue instructions 410 for deciding which execution package to execute for a given row in the temporal table depending on the time dimensions of that row. In one embodiment, the parsing engine 130 will not issue instructions 410. Instead, in one embodiment shown in FIG. 5, the parsing engine 130 will determine the temporal status of the table (i.e., whether it is a ValidTime table, a TransactionTime table, or a bi-temporal table) (block 505), determine the possible temporal conditions (e.g., history row, current row, future row, etc.) that rows in such a table will have (block 510), and create and issue the appropriate execution packages for each such type of row (block 515). In one embodiment, each execution package includes an indicator as to the type of row the execution package is to be applied. The execution engine 150, as shown in FIG. 6, will receive the execution packages (block 605), find the qualified rows in the table (block 610), determine the temporal condition for each qualified row (block 615), and execute the appropriate execution package for each row (block 620). In one embodiment, the execution engine 150 uses indicators in the execution packages 405 to identify the temporal type of row each execution package is intended to process.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method comprising:
creating, at the time a DML statement is to be executed on a temporal database, a first execution package to execute the DML statement comprising a plurality of operations to be executed if the contents of a row in a table in the temporal database indicate the row has a first temporal condition;
creating, at the time the DML statement is to be executed on the temporal database, a second execution package to execute the DML statement comprising a plurality of operations to be executed if the contents of the row in the table in the temporal database indicate the row has a second temporal condition;
selecting between the first execution package and the second execution package;
running an execution engine to execute the DML statement using the selected execution package to produce a result; and
saving the result.

2. The method of claim 1 wherein:
the first execution package comprises an order that the plurality of operations in the first execution package are to be executed by the execution engine; and
the second execution package comprises an order that the plurality of operations in the second execution package are to be executed by the execution engine.

3. The method of claim 1 wherein running the execution engine comprises:
determining that the contents of the row in the table in the temporal database indicate the row has a first temporal condition; and, in response executing the first set of operations for the row.

4. The method of claim 1 wherein running the execution engine comprises:
determining that the contents of the row in the table in the temporal database indicate the row has a first temporal condition; and, in response, executing the operations included in the first execution package for the row in an order specified for the first execution package.

5. The method of claim 1 further comprising:
determining the possible temporal conditions for rows in the table;
providing to the execution engine, as part of execution of the DML statement, an execution package, including the first execution package and the second execution package, for each possible temporal condition.

6. The method of claim 1 further comprising:
providing instructions as to choosing between the first execution package and the second execution package when executing the execution engine for a particular row in the table.

7. A system comprising:
one or more nodes;
a plurality of CPUs, each of the one or more nodes providing access to one or more CPUs;
a plurality of virtual processes, each of the one or more CPUs providing access to one or more virtual processes;
each virtual process configured to manage data stored in one of a plurality of data-storage facilities;
a process configured to optimize execution of a DML statement on a temporal database by:
creating, at the time a DML statement is to be executed on a temporal database, a first execution package package to execute the DML statement comprising a plurality of operations to be executed if the contents of a row in a table in the temporal database indicate the row has a first temporal condition;
creating, at the time the DML statement is to be executed on the temporal database, a the second execution package to execute the DML statement comprising a plurality of operations to be executed if the contents of the row in the table in the temporal database indicate the row has a second temporal condition;
selecting between the first execution package and the second execution package;
running an execution engine to execute the DML statement using the selected execution package to produce a result; and
saving the result.

8. The database system of claim 7 wherein:
the first execution package comprises an order that the plurality of operations in the first execution package are to be executed by the execution engine; and
the second execution package comprises an order that the plurality of operations in the second execution package are to be executed by the execution engine.

9. The database system of claim 7 wherein running the execution engine comprises:
determining that the contents of the row in the table in the temporal database indicate the row has a first temporal condition; and, in response executing the first set of operations for the row.

10. The database system of claim 7 wherein running the execution engine comprises:
determining that the contents of the row in the table in the temporal database indicate the row has a first temporal condition; and, in response, executing the operations included in the first execution package for the row in an order specified for the first execution package.

11. The database system of claim 7 wherein the process further comprises:
determining the possible temporal conditions for rows in the table;
providing to the execution engine, as part of execution of the DML statement, an execution package, including the first execution package and the second execution package, for each possible temporal condition.

12. The database system of claim 7 wherein the process further comprises:
providing instructions as to choosing between the first execution package and the second execution package when executing the execution engine for a particular row in the table.

13. A computer program, stored in a non-transitory computer-readable tangible medium, the program comprising executable instructions that cause a computer to:
create, at the time a DML statement is to be executed on a temporal database, a first execution package to execute the DML statement comprising a plurality of operations to be executed if the contents of a row in a table in the temporal database indicate the row has a first temporal condition;
create, at the time the DML statement is to be executed on the temporal database, a second execution package to execute the DML statement comprising a plurality of operations to be executed if the contents of the row in the table in the temporal database indicate the row has a second temporal condition;
select between the first execution package and the second execution package;
run an execution engine to execute the DML statement using the selected execution package to produce a result; and
save the result.

14. The computer program of claim 13 wherein:
the first execution package comprises an order that the plurality of operations in the first execution package are to be executed by the execution engine; and
the second execution package comprises an order that the plurality of operations in the second execution package are to be executed by the execution engine.

15. The computer program of claim 13 wherein when running the execution engine, the computer:
determines that the contents of the row in the table in the temporal database indicate the row has a first temporal condition; and, in response executing the first set of operations for the row.

16. The computer program of claim 13 wherein when running the execution engine, the computer:
determines that the contents of the row in the table in the temporal database indicate the row has a first temporal condition; and, in response, executing the operations included in the first execution package for the row in an order specified for the first execution package.

17. The computer program of claim 13 further comprising executable instructions that cause a computer to:
determining the possible temporal conditions for rows in the table;
providing to the execution engine, as part of execution of the DML statement, an execution package, including the first execution package and the second execution package, for each possible temporal condition.

18. The computer program of claim 13 further comprising executable instructions that cause a computer to:
providing instructions as to choosing between the first execution package and the second execution package when executing the execution engine for a particular row in the table.

* * * * *